US011484828B2

(12) United States Patent
Johnson

(10) Patent No.: US 11,484,828 B2
(45) Date of Patent: Nov. 1, 2022

(54) AMBIENT WATER CONDENSER SYSTEM

(71) Applicant: Lonnie Johnson, Atlanta, GA (US)

(72) Inventor: Lonnie Johnson, Atlanta, GA (US)

(*) Notice: Subject to any disclaimer, the term of this patent is extended or adjusted under 35 U.S.C. 154(b) by 441 days.

(21) Appl. No.: 16/588,962

(22) Filed: Sep. 30, 2019

(65) Prior Publication Data
US 2020/0316518 A1    Oct. 8, 2020

Related U.S. Application Data

(60) Provisional application No. 62/829,077, filed on Apr. 4, 2019.

(51) Int. Cl.
*B01D 53/26* (2006.01)
*C02F 1/44* (2006.01)
*E03B 3/28* (2006.01)
*B01D 5/00* (2006.01)
*B01D 61/36* (2006.01)
*B01D 53/14* (2006.01)

(52) U.S. Cl.
CPC ........... *B01D 53/263* (2013.01); *B01D 5/006* (2013.01); *B01D 53/1418* (2013.01); *B01D 53/1425* (2013.01); *B01D 53/268* (2013.01); *B01D 61/362* (2013.01); *C02F 1/448* (2013.01); *E03B 3/28* (2013.01); *B01D 2311/2626* (2013.01); *B01D 2311/2669* (2013.01); *B01D 2313/22* (2013.01)

(58) Field of Classification Search
CPC ....................................................... C02F 1/448

USPC .......... 261/5, 128, 75, 119.1, 100; 96/7, 240
See application file for complete search history.

(56) References Cited

U.S. PATENT DOCUMENTS

| | | | | | |
|---|---|---|---|---|---|
| 4,219,341 | A | * | 8/1980 | Hussmann | B01D 5/0003 62/271 |
| 4,304,577 | A | * | 12/1981 | Ito | B01D 53/261 96/127 |
| 7,722,706 | B2 | * | 5/2010 | Thielow | B01D 53/28 96/272 |
| 2005/0103615 | A1 | * | 5/2005 | Ritchey | B01D 5/0072 203/10 |
| 2006/0191411 | A1 | * | 8/2006 | Johnson | B01D 53/263 95/187 |
| 2010/0090356 | A1 | * | 4/2010 | Sines | B01D 53/28 261/29 |
| 2013/0227879 | A1 | * | 9/2013 | Lehky | B01D 53/28 96/240 |

(Continued)

*Primary Examiner* — Nina Bhat
(74) *Attorney, Agent, or Firm* — Baker Donelson Bearman Caldwell & Berkowitz, PC

(57) ABSTRACT

An ambient water condenser system is described having a condensation chamber which at least partially contains or surrounds a fluid reservoir which contains a volume or mass of an aqueous hygroscopic solution for condensing water from ambient air and a distillation process for extracting the water from the solution. The fluid reservoir has a heat source, a lower porous hydrophobic membrane, and an upper porous hydrophobic membrane. The heat source causes the hygroscopic solution near the top of reservoir to have a higher temperature which causes it to have a higher water vapor pressure, whereby the water vapor passing through the upper porous hydrophobic membrane and into the condensation chamber condenses into liquid water.

20 Claims, 4 Drawing Sheets

(56) References Cited

U.S. PATENT DOCUMENTS

| | | | |
|---|---|---|---|
| 2014/0283690 A1* | 9/2014 | Smith | F24F 3/1411 |
| | | | 96/7 |
| 2016/0033192 A1* | 2/2016 | Martin | F24F 3/1417 |
| | | | 62/91 |
| 2016/0237659 A1* | 8/2016 | Thielow | E03B 3/28 |
| 2017/0184318 A1* | 6/2017 | Velasco Valcke | E03B 3/28 |
| 2018/0202671 A1* | 7/2018 | Martin | F28B 9/06 |
| 2019/0184334 A1* | 6/2019 | Moghaddam | F25B 15/02 |

\* cited by examiner

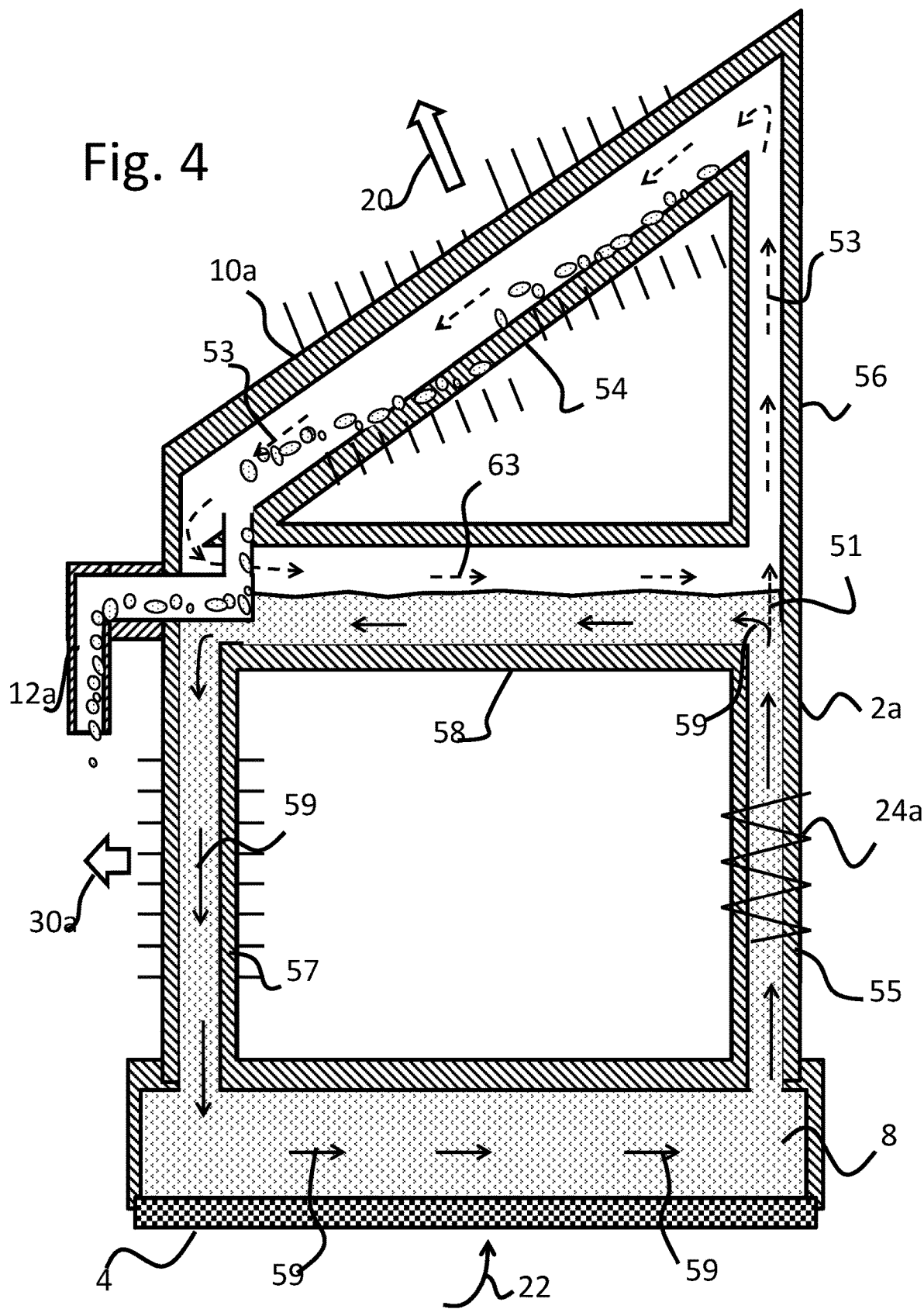

AMBIENT WATER CONDENSER SYSTEM

RELATED APPLICATION(S)

Under provisions of 35 U.S.C. § 119(e), Applicant claims the benefit of U.S. provisional application No. 62/829,077 entitled "Ambient Water Condenser," filed Apr. 4, 2019, which is incorporated herein by reference.

FIELD OF THE INVENTION

The present invention relates, in general, to an improved ambient water condenser device, system and method. More specifically, the present invention relates to improved ambient water condenser apparatuses, assemblies, methods, and systems having components configured to provide potable water extracted from ambient air.

BACKGROUND OF THE INVENTION

Although the Earth's surface is approximately seventy-one percent water, over ninety-five percent of this water is found in oceans making it non-potable. The remaining approximately fifteen percent of the Earth's water exists in rivers, in lakes, in icecaps, in glaciers, in ground water, in aquifers and as water vapor. With the Earth's population exceeding seven billion people, there is an increasing need to provide sources of fresh potable water, especially in arid climates and underdeveloped areas with limited access to water.

There are numerous applications where devices that extract water from the ambient atmosphere would be of useful. Applications range from supplying drinking water in geographical locations where fresh water is scarce to home use applications such as a practical device for maintaining house hold flower plants in a watered state. For example, it is much more practical to make electrical connections to flower plants in a building where distributed power is typically available. In such an application, there would be no need to run water lines to flower plants, only an electrical connection. The device uses heat energy to drive the extraction process. The heat may be provided from a range of sources depending on the application. For example, for large scale production of drinking water in arid climates, solar would be an attractive heat source. On the other hand, an electrical power source could be optimal for production of water in smaller scale applications such as building dehumidification.

Atmospheric water generators utilizing water condensation systems are commonly used to extract water from the ambient atmosphere. However, many of these systems are expensive requiring bulky, inefficient components operating in sizable water condensation systems. Other solutions for creating potable water include water desalination systems and fog harvesters. However, many of these solutions are quite cumbersome, inefficient, and expensive as well.

Accordingly, there remains a need for improved, efficient, inexpensive atmospheric water extraction systems. There are numerous applications where devices that extract water from the ambient atmosphere would be of useful such as supplying drinking water in geographical locations where fresh water is scarce as well as for maintaining household plants in a watered state. This need and other needs are satisfied by the various aspects of the present disclosure.

SUMMARY OF THE INVENTION

An improved ambient water condenser is provided. In accordance with the purposes of the disclosure, as embodied and described herein, the disclosure, in one aspect, relates to an improved ambient water condenser system, such as, for example a means for extracting water from the ambient atmosphere. In further aspects, an improved ambient water condenser device, system and method are provided to supply drinking water in geographical locations where fresh water is scarce. The disclosure relates to a hygroscopic solution for condensing water from ambient air and a distillation process for extracting the water from the hygroscopic solution, wherein the hygroscopic solution is a desiccant.

The ambient water condenser includes a hygroscopic solution reservoir containing an aqueous hygroscopic solution, at least one porous hydrophobic membrane configured such that an aqueous hygroscopic solution does not permeate through the pores of the membrane while gases such as water vapor freely permeates the porous hydrophobic membrane, a condensation chamber configured to transform water vapor to liquid water via the condensation process, a drip tube configured to receive condensed water flowing out of the condensation chamber, a heat collector, a heat transfer member wherein the heat collector may be thermally coupled to the interior of the hygroscopic solution reservoir, and a heat source. In further aspects, the hygroscopic solution reservoir having an entrance and an exit, wherein the aqueous hygroscopic solution may be contained within the hygroscopic solution reservoir. The entrance to the hygroscopic solution reservoir may be coupled to external ambient air via a first porous hydrophobic membrane. Moisture may be absorbed by the hygroscopic solution from the external ambient air at the entrance of the hygroscopic solution reservoir. The exit of the hygroscopic solution reservoir is coupled to the interior of the condensation chamber and may include a second porous hydrophobic membrane coupling the exit of the reservoir to the condensation chamber. The heat source may be coupled to hygroscopic solution at the exit of the hygroscopic solution reservoir to heat the solution and cause water to evaporate therefrom. The condensation chamber may be thermally coupled to external ambient air to limit a temperature increases thereof so as to facilitate condensation of water evaporated from the hygroscopic at the exit of the solution reservoir. The absorption rate may be such that the hygroscopic solution at the entrance may be maintained in near equilibrium moisture partial pressure with the external ambient air. In operation, the device absorbing moisture from ambient air at the entrance and evaporating the absorbed water into the condensation chamber wherein it is condensed into liquid and released for external use.

The present disclosure provides an atmospheric water extractor with multiple applications. In one or more aspects, for example, the disclosure may facilitate large scale production of drinking water in arid climates. In this and other instances, solar energy may be the primary heat source. In other instances, an electrical power source may be the optimal power source for production of water in smaller scale applications such as watering household flower plants or building dehumidification. The device may use heat energy to drive the water extraction process. In one or more instances, the heat may be provided from a range of sources including solar power, heat energy, power plants, electrical current and other means depending on the application.

Still in further aspects, the improved ambient water condenser device further comprises a heat source operating to increase the temperature of the hygroscopic solution near the exit of the hygroscopic reservoir to evaporate water from the hygroscopic solution, wherein evaporated water thereafter condenses in the condensation chamber.

In yet still further aspects; the invention further comprises an hydrophobic membrane for containing the hydroscopic solution while providing for passage of water vapor into and out of the hygroscopic solution.

Additional aspects, objectives, features and advantages of the present invention will become apparent from the following description of the preferred embodiments with reference to the attached drawings.

BRIEF DESCRIPTION OF THE DRAWINGS

FIG. 4 is a perspective view of an ambient water condenser system in yet another preferred form of the invention.

DETAILED DESCRIPTION OF THE INVENTION

Figure 1:
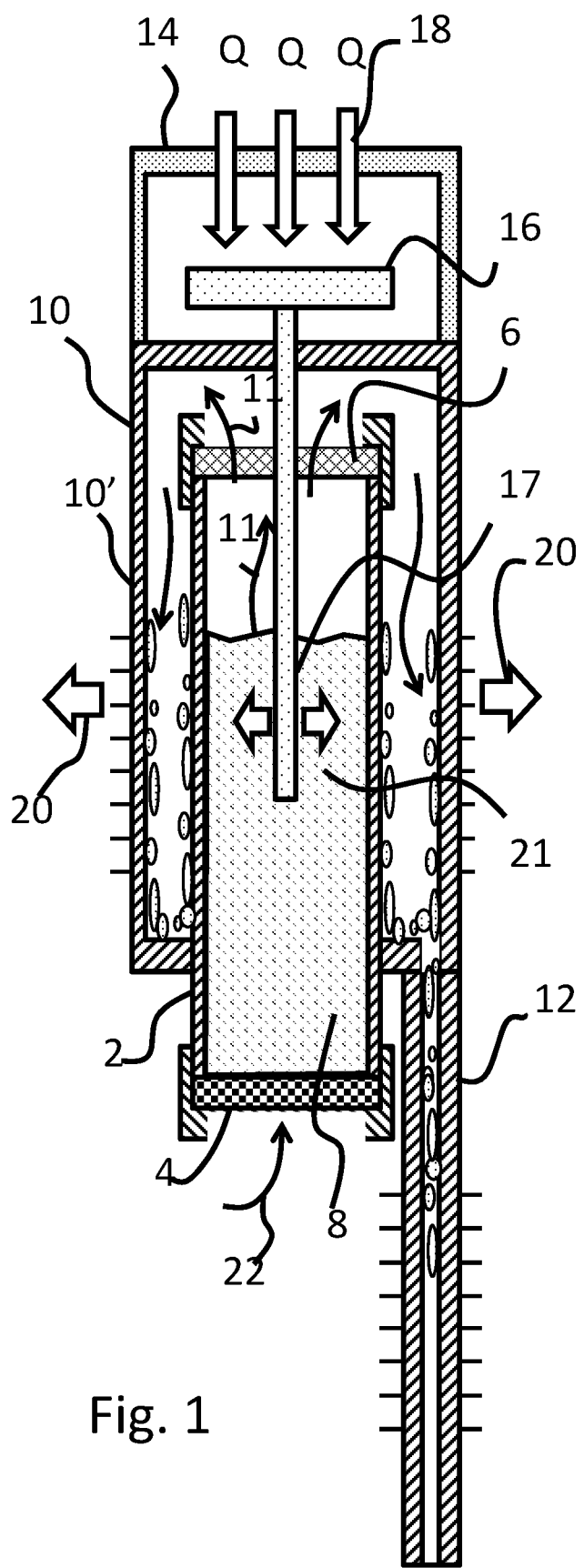
FIG. 1 is a perspective view of an ambient water condenser system in a preferred form of the invention.

With reference next to the drawings, there is shown an ambient water condenser system 1 in a preferred form of the invention. The ambient water condenser system may also be termed as an atmospheric water extraction device. The condenser system 1 includes a condensation chamber 10 having exterior walls 10' which at least partially contain or surround a fluid reservoir 2. The condensation chamber 10 has a lower end which is coupled to and in fluid communication with a drip tube 12.

The condenser system 1 also has an infrared transparent cover 14 which forms a heat chamber with the condensation chamber 10, and a heat collection surface or collector 16 positioned beneath the cover 14 and within the heat chamber. The collector 16 is coupled in thermal communication with a heat transfer member 17 which extends through the top end of the condensation chamber 10 and into the reservoir 2. Heat transfer member 17 is a heat conductive material such as copper or aluminum, or it may be a heat pipe or other heat transfer device.

The fluid reservoir 2 contains a volume or mass of an aqueous hygroscopic solution 8 for condensing water from ambient air and a distillation process for extracting the water from the solution. The fluid reservoir 2 includes a lower porous hydrophobic membrane 4 and an upper porous hydrophobic membrane 6. The nature of hydrophobic porous membranes 4 and 6 is such that hygroscopic solution 8, being an aqueous liquid, does not wet or pass through the membrane's pores; however, a gas such as water in its vapor phase, freely passes through yet liquid water is prevented from passing therethrough. Lower porous membrane 4 couples reservoir 2 to external ambient air (the water vapor source). Hygroscopic solution 8 near the entrance or lower end of the reservoir exchanges moisture with the source through lower membrane 4 so as to approach water vapor pressure equilibrium therewith. Upper porous membrane 6 couples reservoir 2 to the interior of condensation chamber 10.

Infrared transparent cover 14 and collector 16 function as a collector of radiated heat such as solar. Cover 14 encloses collector 16 to prevent heat collected by 16 from being lost to ambient air via convective heat transfer. As such, collector 16 and thereby heat transfer member 17 can be maintained at an elevated temperature by heat 18 collected from an external source. Operation is such that heat 18 (Q) captured by collector 16 is transferred to the hygroscopic solution 8 by heat transfer member 17 as indicated by arrow 21.

The higher temperature of hygroscopic solution 8 near the top of reservoir 2 causes it to have a higher water vapor pressure. Water vapor evaporates out of the hygroscopic solution 8 and exits reservoir 2 through upper porous hydrophobic membrane 6 as illustrated by arrows 11. The walls of chamber 10, being thermally coupled to ambient air, are maintained at a temperature that is lower than that of hygroscopic solution 8 near the top of reservoir 2. Water vapor leaves reservoir 2 through upper porous hydrophobic membrane 6 at a higher temperature and partial pressure than that of water on the outside of the condensation chamber 10. As such, water vapor leaving reservoir 2 condenses onto the inner surface of condensation chamber 10 as it transfers its heat of condensation thereto, illustrated by arrow 20. Heat of condensation 20 is, in turn, coupled to the external ambient air. The resulting condensed water flows out of condensation chamber 10 through drip tube 12.

The density of hygroscopic solution 8 increases as the water it contains evaporates. The natural tendency is for high density solution to drift toward the bottom of reservoir 2 and displace lower density, higher water content hygroscopic solution. The displaced low density hygroscopic solution rises toward the top of the reservoir where it is heated which causes it to release its absorbed water. Hygroscopic solution 8 flowing from the top portion to the bottom portion of reservoir 2 cools and thereafter absorbs water to achieve thermodynamic equilibrium with the temperature and water vapor partial pressure of the surrounding air ambient, the bottom portion of reservoir 2 being thermally coupled to the air. As it cools, its water vapor pressure decreases to a level below the water vapor partial pressure of the external ambient air which causes it to absorb atmospheric water vapor through hydrophobic membrane 4. Thus, replenish solution continuously drifts upward, because of its lower density, as water depleted, higher density solution continuously drifts downward, thus forming a continuous cyclical flow. The operation results in water being continuously extracted from the ambient air and supplied to drip tube 12, which in turn empties the water into a holding tank 40, which is shown in FIG. 2.

Figure 2:
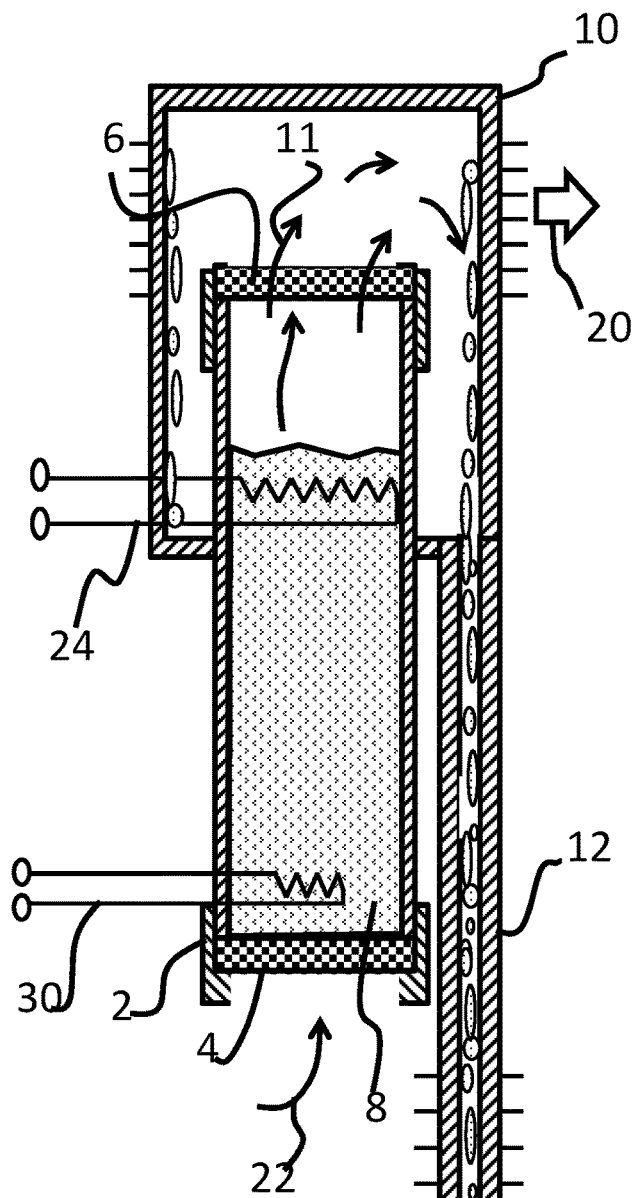
FIG. 2 is a perspective view of an ambient water condenser system in another preferred form of the invention.

FIG. 2 shows an alternate embodiment of the invention wherein hygroscopic fluid 8 is heated near the top of reservoir 2 by applying electrical power to heater 24. Optional secondary heater 30 has been added in FIG. 2. Optional heater 30 elevates the overall temperature of the hygroscopic fluid so as to suppress atmospheric water absorption by raising its temperature and thereby the water vapor pressure. It protects the device under conditions of very high humidity where the hygroscopic solution otherwise absorb more water than is needed or than can be contained within reservoir 2.

Figure 3:
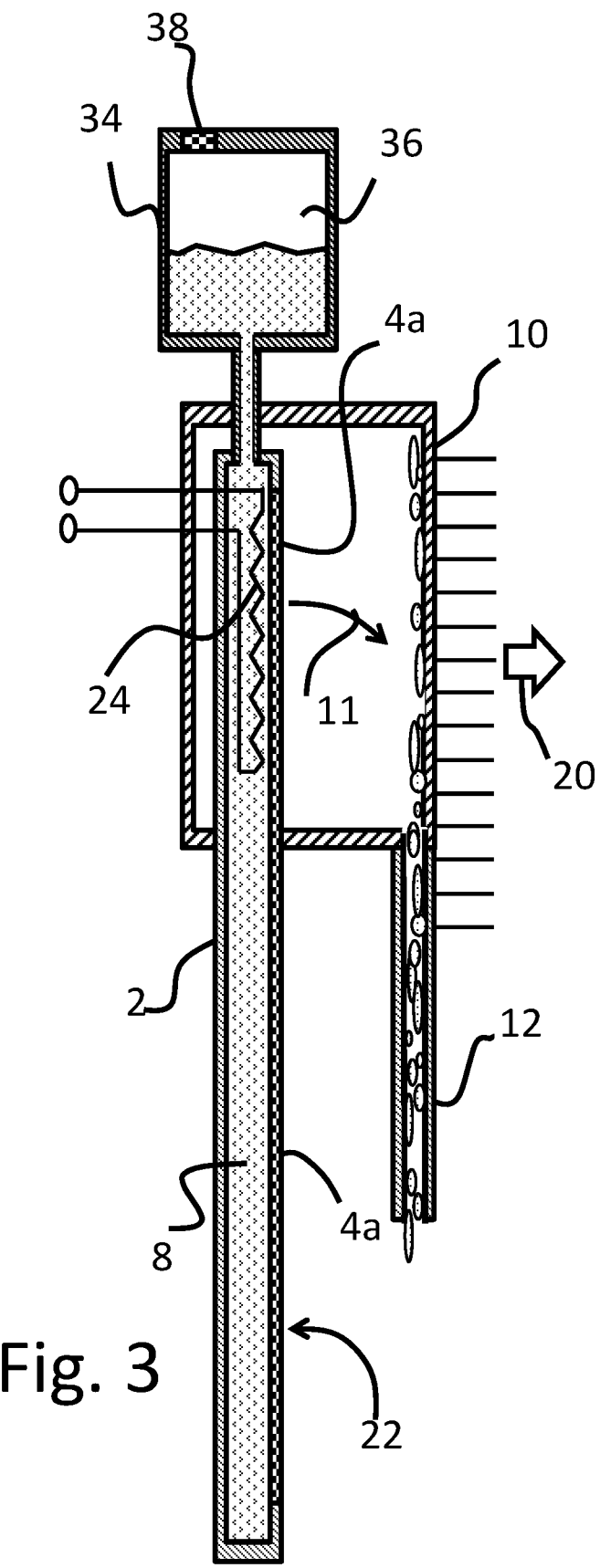
FIG. 3 is a perspective view of an ambient water condenser system in another preferred form of the invention.

FIG. 3 shows an embodiment of the invention that includes ullage chamber 34 for accommodating changes in the overall water content equilibrium state of hygroscopic solution 8. Excess volume 36 allows solution 8 to expand and contract as needed as its average water content varies with ambient humidity conditions. Under high humidity conditions, solution 8 expands in volume as it absorbs water from the ambient through membrane 4a to reach a point where solution 8 in the lower portion of reservoir 2 has a water vapor pressure that equals the water vapor partial pressure of ambient air. Conversely, during low humidity conditions, solution 8 contracts as water evaporates from it until solution 8 in the lower portion of reservoir 2 reaches a water vapor pressure that equals the ambient air water vapor partial pressure. Ullage chamber 34 protects the device under conditions of very high humidity where the hygroscopic solution absorbs more water than could otherwise be contained within reservoir 2. Ullage chamber 34 maintains solution at the entrance and exit of reservoir 2 even though the actual volume of the solution may vary.

In addition, this embodiment shows use of a single diffusion membrane 4a which extends from the top of reservoir 2 within condensation chamber 10 down to the bottom of reservoir 2 exposed to ambient air. Hygroscopic fluid 8 is heated near the top of reservoir 2 by applying electrical power to heater 24. Heat supplied near the top of reservoir 2 causes the vapor pressure of water in the solution to rise to a level such that it evaporates out of the solution and exits reservoir 2 by diffusing through the top region of membrane 4 as illustrated by arrow 11. The walls of chamber 10 are maintained at a temperature that is lower than that of hygroscopic solution being heated in reservoir 2 as chamber 10 is thermally coupled to the surrounding ambient air. Water vapor leaves reservoir 2 through membrane 4a in a superheated state, temperature and partial pressure, relative to the lower temperature and vapor pressure of water on the walls of condensation chamber 10. As such, the water vapor diffuses through the portion of membrane 4a that extends into chamber 10 and condenses onto the inner walls of condensation chamber 10 as it transfers its heat of condensation 20 thereto. Heat of condensation 20 is subsequently coupled to the external ambient air. The resulting condensed water flows out of condensation chamber 10 through drip tube 12.

The density of hygroscopic solution 8 increases as the water it contains evaporates. The natural tendency is for the high density solution to drift toward the bottom of reservoir 2. In doing so it displaces lower density, higher water content solution. The displaced low density solution rises toward the top of the reservoir where it is heated which causes it to release its absorbed water. The concentrated solution at the bottom of reservoir 2 cools due to heat transfer to the surrounding air. As it cools, its water vapor pressure decreases to a level below the water vapor partial pressure of the external ambient air which causes solution 8 to absorb atmospheric water vapor 22 through the portion of membrane 4a that is exposed to ambient air. Thus, water replenished solution continuously drifts upward, because of its lower density, as water depleted, higher density solution continuously drifts downward, cools an absorbs ambient water. The operation results in water being continuously extracted from the ambient air and supplied to drip tube 12. An alternative heat source such as solar or other suitable heat source may be used in place of heater 24.

FIG. 4 shows an alternate configuration that utilizes convective circulation to promote more effective operation of the atmospheric moisture condenser. Hygroscopic solution reservoir 2a is configured as a flow loop consisting of heated substantially vertical column 55 which is heated by heat source 24a and cooled substantially vertical column 57 where it dissipates heat 30a to the external environment. Hygroscopic solution 8 circulates within reservoir 2a under natural convective flow as represented by arrows 59 as heat is supplied to column 55 and removed from column 57. Denser, cooled, moisture depleted, low water vapor pressure, hygroscopic solution 8 leaves column 57 and circulates past membrane 4. While passing porous hydrophobic membrane 4, it absorbs atmospheric moisture 22. Solution 8 then enters vertical column 55 where it is heated causing water vapor 51 to evaporate out of solution. Condensation chamber 10a in this example is configured as a flow loop that shares common conduit 58 with reservoir 2a. The heating of solution 8 in column 55 results in water vapor 51 evaporating out of solution and rising into substantially vertical column 56 with water depleted solution 8 passing into conduit 58. Gas contained in condensation chamber 10a circulates as indicated by arrows 53 and 63 under the force of natural convection. The circulation is driven by heated water vapor 51 flowing upward in column 56 which is then cooled as it flows downward in section 54. As the gas is cooled in section 54 of the condensation chamber 10a, water vapor condenses as the mixture flows downward. Section 54 is thermally coupled to the ambient environment such that heat of condensation 20 is rejected thereto. The resulting water condensate is collected by tube 12a as illustrated.

It thus is seen that an ambient water condenser system is now provided which is more efficient and simple in form. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. An ambient water condenser system comprising:
   a volume of hygroscopic solution;
   a fluid reservoir containing said volume of hygroscopic solution, said fluid reservoir having an exit, an entrance in fluid communication with ambient air, and a first gas permeable hydrophobic membrane mounted at said entrance having a first side exposed to ambient air and a second side oppositely disposed from said first side exposed to said hygroscopic solution which allows the passage of water vapor therethrough from ambient air to said hygroscopic solution and prevents the passage of liquid water therethrough, a second gas permeable hydrophobic membrane mounted at said exit which allows the passage of water vapor therethrough from said hygroscopic solution and prevents the passage of liquid water therethrough from said hygroscopic solution;
   a heat source in thermal communication with said hygroscopic solution within said fluid reservoir;
   a condensation chamber in fluid communication with said fluid reservoir through said exit and said second gas permeable hydrophobic membrane;
   whereby the hygroscopic solution near the entrance of the reservoir absorbs water vapor, and the heater element operates to increase the temperature the hygroscopic solution to raise its vapor pressure to release water vapor into the condensation chamber where the water vapor then condenses.

2. The ambient water condenser system of claim 1 further comprising a second porous hydrophobic membrane, the second porous hydrophobic membrane being positioned to allow water vapor to pass through said exit and prevent liquid water from passing through said exit.

3. The ambient water condenser system of claim 1 wherein said heat source is positioned to heat said hygroscopic solution adjacent said exit and distal said entrance.

4. The ambient water condenser system of claim 1 wherein said heat source is a solar heat source.

5. The ambient water condenser system of claim 1 wherein said heat source is an electric resistant heat source.

6. The ambient water condenser system of claim 1 wherein said condensation chamber is thermally coupled to a water source to maintain at a temperature lower than the temperature of hygroscopic solution adjacent the reservoir exit.

7. The ambient water condenser system of claim 1 further comprising an ullage container in fluid communication with said reservoir.

8. The ambient water condenser system of claim 1 further comprising a drip tube coupled to said condensation chamber.

9. The ambient water condenser system of claim 8 further comprising a water holding tank coupled to said drip tube.

10. An atmospheric water extraction device comprising,
a hygroscopic solution reservoir having a water vapor entrance positioned at a lower portion of said hygroscopic solution reservoir and an exit positioned at an upper portion of said hygroscopic solution reservoir;
a hygroscopic solution contained within said reservoir;
a condensation chamber in fluid communication with said hygroscopic solution reservoir;
and a heat source in thermal communication with said hygroscopic solution;
said entrance of said reservoir being in fluid communication with external ambient air;
said exit of said reservoir being in fluid communication with the interior of said condensation chamber,
a gas permeable hydrophobic membrane mounted within said entrance and said exit, and
said hygroscopic solution reservoir and said gas permeable hydrophobic membrane preventing direct contact between said hygroscopic solution and external ambient air,
whereby ambient air moisture is absorbed by the hygroscopic solution at the entrance of the reservoir such that the hygroscopic solution is maintained in near equilibrium moisture partial pressure with ambient air, and with the heat source operating to increase the temperature of the hygroscopic solution near the exit of the reservoir the water evaporates from the solution, the evaporated water condenses in the condensation chamber.

11. The atmospheric water extraction device of claim 10 wherein said gas permeable hydrophobic membrane includes a first gas permeable hydrophobic membrane mounted to said entrance.

12. The atmospheric water extraction device of claim 11 wherein said gas permeable hydrophobic membrane also includes a second gas permeable hydrophobic membrane mounted to said exit.

13. The ambient water condenser system of claim 10 further comprising an ullage container in fluid communication with said reservoir.

14. An ambient atmospheric water extraction device, the device comprising;
a hygroscopic solution reservoir having an entrance and an exit;
a hygroscopic solution contained within said hygroscopic solution reservoir;
a first hydrophobic moisture vapor permeable membrane;
a condensation chamber, and
and a heat source,
said first hydrophobic moisture vapor permeable membrane covering said entrance of said reservoir and coupling the solution therein to ambient atmospheric air,
said exit of the reservoir being coupled to the interior of said condensation chamber,
said heat source being thermally coupled to said hygroscopic solution,
said condensation chamber being thermally coupled to ambient air,
whereby diffusion of ambient air moisture through the first membrane maintains the hygroscopic solution near the entrance of the reservoir in near equilibrium with the partial pressure of ambient atmospheric water vapor, the heater element operating to increase the temperature the solution near the exit of the reservoir to raise the partial pressure of moisture therein causing it to evaporate from the solution into the condensation chamber where it condenses at the near ambient temperature of the condensation chamber.

15. The atmospheric water extraction device of claim 14 further comprising a second moisture permeable membrane, said second moisture permeable membrane being mounted to said exit of said reservoir and coupling said exit of the reservoir to the interior of said condensation chamber,
whereby water evaporated from the solution enters the condensation chamber by passing through the second membrane.

16. The atmospheric water extraction device of 14 wherein said first moisture permeable membrane is a porous hydrophobic material.

17. The atmospheric water extraction device of claim 15 wherein the second moisture permeable membrane is a porous hydrophobic material.

18. The atmospheric water extraction device of claim 14 further comprising a drip tube connected to said condensation chamber.

19. The atmospheric water extraction device of claim 14 further comprising an ullage chamber for accommodating changes in the overall water content equilibrium state of the hygroscopic solution,
whereby the ullage reservoir allows the solution to expand and contract as needed as its average water content varies with ambient humidity.

20. The atmospheric water extraction device of claim 14 wherein the hydrophobic moisture vapor permeable membrane couples the reservoir to the condensation chamber and to ambient air, whereby water vapor entering the hygroscopic solution through the hydrophobic membrane from ambient air and evaporating from the hydrophobic solution through the hydrophobic membrane into the condensation chamber.

* * * * *